(12) United States Patent
Calhoun

(10) Patent No.: US 7,798,535 B2
(45) Date of Patent: Sep. 21, 2010

(54) PIPE CLAMP

(75) Inventor: Gregory L. Calhoun, Irwin, PA (US)

(73) Assignee: Westinghouse Electric Co. LLC, Cranberry Township, PA (US)

( * ) Notice: Subject to any disclaimer, the term of this patent is extended or adjusted under 35 U.S.C. 154(b) by 0 days.

(21) Appl. No.: 11/856,119

(22) Filed: Sep. 17, 2007

(65) Prior Publication Data

US 2009/0072530 A1 Mar. 19, 2009

(51) Int. Cl.
*F16L 21/02* (2006.01)

(52) U.S. Cl. ............... 285/373; 285/328; 285/411; 285/415; 285/419

(58) Field of Classification Search ......... 403/289, 403/290, 335, 337, 338; 24/284, 279; 285/903, 285/373, 419, 367, 328, 406, 411, 283, 413, 285/414, 415
See application file for complete search history.

(56) References Cited

U.S. PATENT DOCUMENTS

| | | | | |
|---|---|---|---|---|
| 2,089,230 | A | * | 8/1937 | Thowless ............... 279/55 |
| 3,231,298 | A | | 1/1966 | Tomb et al. |
| 4,832,380 | A | | 5/1989 | Oetiker |
| 5,058,931 | A | | 10/1991 | Bowsher |
| 5,354,108 | A | | 10/1994 | Sandor |
| 5,582,440 | A | * | 12/1996 | Pascaru ............... 285/373 |
| 6,053,652 | A | | 4/2000 | Deaver et al. |
| 6,086,120 | A | | 7/2000 | Deaver et al. |
| 6,108,391 | A | | 8/2000 | Deaver et al. |
| 6,264,203 | B1 | | 7/2001 | Weems et al. |
| 6,302,450 | B1 | * | 10/2001 | Dole et al. ............ 285/328 |
| 6,375,230 | B1 | | 4/2002 | Jensen et al. |
| 6,398,270 | B1 | * | 6/2002 | Fukui et al. .......... 285/373 |
| 6,517,122 | B1 | * | 2/2003 | Minemyer ............ 285/328 |
| 6,672,628 | B2 | * | 1/2004 | Thomas et al. ........ 285/320 |
| 7,118,299 | B2 | * | 10/2006 | Gregel et al. ......... 403/305 |
| 2005/0253029 | A1 | * | 11/2005 | Gibb et al. ........... 248/158 |
| 2006/0152004 | A1 | * | 7/2006 | Luo ..................... 285/405 |
| 2007/0152444 | A1 | * | 7/2007 | Kertesz et al. ........ 285/406 |

OTHER PUBLICATIONS

"Circumference", Merriam-Webster Online Dictionary, Retrieved Feb. 21, 2010, from http://www.merriam-webster.com/dictionary/circumference.*

* cited by examiner

*Primary Examiner*—Michael P Ferguson
*Assistant Examiner*—Jay R Ripley

(57) ABSTRACT

A pipe clamp for reinforcing a welded joint between two pipes, having a plurality of circumferential clamp segments that are bolted together around the joint. One axial end of the clamp has circumferentially extended ridges that project inward and seat in corresponding circumferential grooves in a pipe on one side of the joint. The other axial end of the clamp has circumferentially spaced fingers that extend inward and fit into corresponding pockets on the other side of the weld joint. Either or both the ridges or the fingers have a taper whose cross-section reduces in an inward direction and fits in complimentary grooves or pockets on either side of the joint. The taper forces the opposite sides of the weld joint toward each other as the clamp segments are tightened together.

17 Claims, 8 Drawing Sheets

PIPE CLAMP

BACKGROUND OF THE INVENTION

1. Field of the Invention

This invention relates generally to pipe clamps and, more directly, is particularly suited for repairing jet pump riser assemblies within a boiling water nuclear reactor pressure vessel.

2. Description of the Prior Art

A reactor pressure vessel of a boiling water reactor typically has a generally cylindrical shape and is closed at both ends by a bottom head and a removable top head. A top guide typically is spaced above a core plate within the reactor pressure vessel. A core shroud typically surrounds a core and is supported by a shroud support structure. Particularly, the shroud has a generally cylindrical shape and surrounds both the core plate and the top guide. The top guide includes several openings through which fuel bundles are inserted with the fuel bundles supported by the core plate.

Water enters the reactor pressure vessel through an inlet nozzle in the reactor pressure vessel sidewall. A jet pump riser assembly is coupled to the inlet nozzle and the jet pump riser assembly typically includes, in part, a thermal sleeve, a lower elbow and a riser pipe. The thermal sleeve extends through the inlet nozzle and is welded to one end of the elbow. In some plants an extension, also known as a pup is welded between the thermal sleeve and the elbow. The other end of the elbow is welded to the riser pipe. The riser pipe is positioned between and extends substantially parallel to the reactor pressure vessel sidewall and the shroud in the relatively narrow space between the reactor pressure vessel and the shroud.

During operation, the jet pump assembly directs recirculation flow within the reactor pressure vessel. Accordingly, substantial amounts of water are forced through the jet pump assembly and significant hydraulic forces and vibration are exerted on the jet pump assembly, including on the jet pump assembly elbow. Furthermore, and during operation, a large amount of heat is generated within the reactor pressure vessel, thus placing thermal stress on the jet pump assembly. These hydraulic forces, vibration stresses, and thermal stresses might cause stress corrosion cracking in the riser pipe elbow, and in extreme cases, the riser pipe elbow could separate from the thermal sleeve which is undesirable.

Stress corrosion cracking is a known phenomenon occurring in reactor components, such as structural members, piping, fasteners, and welds, exposed to high temperature water. The reactor components are subject to a variety of stresses associated with, e.g., differences in thermal expansion, the operating pressure needed for the containment of the reactor cooling water, and other sources such as residual stresses from welding, cold working and other inhomogeneous metal treatments. In addition, water chemistry, welding, heat treatment and radiation can increase the susceptibility of metal in a component to exhibit stress corrosion cracking.

It would be desirable to provide an apparatus which provides support for a jet pump riser elbow, and, more particularly, the connection between the riser elbow and the thermal sleeve. Preferably, such an apparatus would maintain axial pressure between the riser elbow and the thermal sleeve to minimize leakage should the weld therebetween fail. Additionally, it would also be desirable to provide such an apparatus which is easy to install remotely as a repair in the limited access space available.

A number of clamp designs have attempted to address these issues, for example U.S. Pat. Nos. 6,053,652, 6,086, 120, 6,108,391, 6,264,203 and 6,375,230. Further improvement is still desired to control the amount of any leakage and ease installation in a very confined area. In addition, it is desired to provide such support for both the weld between the thermal sleeve and the extension and the weld between the extension and the elbow in those plants that employ an extension. Further, it is desirable to provide such support that will take into consideration the reduced thickness of the elbow as compared to the thermal sleeve.

SUMMARY OF THE INVENTION

These and other objectives are achieved by the clamp of this invention that comprises in part a first clamp segment having a radial inner surface that substantially matches the curvature of the circumference of a corresponding first segment of the mating ends of the elbow and the thermal sleeve. The first clamp segment is preferably semicircular having a first ridge adjacent a first axial end. Preferably the first ridge extends inwardly in a direction parallel to a force vector that draws the first clamp segment together with a second clamp segment, and circumferentially to mate with a corresponding circumferential groove in the outer wall of the elbow adjacent the end of the elbow that is coupled to the thermal sleeve. A first clamp segment has a first finger adjacent to second axial end. The first finger extends inwardly in a direction parallel to the force vector that draws the first clamp segment together with the second clamp segment, to mate with a corresponding pocket in the thermal sleeve near the end of the sleeve that connects to the elbow. A circumferential dimension of the first ridge is substantially larger than a corresponding circumferential dimension of the first finger. The clamp of this invention further includes a second clamp segment having a radial inner surface that substantially matches the curvature of the first clamp segment. The second clamp segment has a second ridge adjacent to a first axial end of the second clamp segment. The second ridge extends inwardly in a direction parallel to the force vector that draws the first clamp segment together with the second clamp segment, and circumferentially to mate with a corresponding circumferential groove in the end of the elbow. The second clamp segment also has a second finger adjacent a second axial end of the second clamp segment, the second finger extending inwardly in a direction parallel to the force vector that draws the first clamp segment together with the second clamp segment, to mate with a corresponding pocket in the thermal sleeve adjacent the end that is coupled to the elbow. A circumferential dimension of the second ridge is substantially larger than a corresponding circumferential dimension of the second finger. Means are provided for drawing the first and second clamps together so that the ridges seat in the corresponding grooves in the elbow and the fingers seat in the corresponding pockets in the thermal sleeve. The first clamp segment and the second clamp segment are then securely clamped together to reinforce the connection between the elbow and the thermal sleeve.

In one preferred embodiment, the radial inner surface of the first clamp segment and the second clamp segment between the ridges and the fingers are suspended above and spaced from the outer surface of the elbow, weld and thermal sleeve with only the ridges making contact with the grooves on the elbow and the fingers making contact with the pockets on the thermal sleeve.

In the preferred embodiment the means for connecting the first clamp segment to the second clamp segment includes radial outwardly extending lips at both circumferential ends of the first clamp segment and the second clamp segment where one of the lips on the first clamp segment is joined to one of the lips on the second clamp segment and the other of the lips on the first clamp segment is joined to the other of the lips on the second clamp segment. In one embodiment the lips on the first clamp segment and the second clamp segment are joined by bolts.

Preferably the fingers are tapered with a cross section narrowing in the extended, inwardly direction. Desirably, the pockets have a corresponding taper so that the ends of the elbow and thermal sleeve are drawn toward each other as the bolts extending through the lips are tightened.

In one preferred embodiment either or both the ridges and the fingers are nondestructively, removably seated within a recess in the radial inner surface of the first clamp segment and the second clamp segment. In one embodiment the ridges or the fingers are seated in the recess in the radial inner surface by a mechanical connection. Preferably the mechanical connection is a bolted connection or an interference fit.

Preferably the first clamp segment has a plurality of circumferentially spaced fingers adjacent the second axial end and desirably the first clamp segment has twice as many fingers as it has ridges.

In a broader sense, the invention described herein has application to a piping assembly comprised of at least a first pipe and a second pipe having radial and axial dimensions and a clamping assembly for coupling a joint between opposing ends of the first and second pipes which may include an intermediate connection. The clamp assembly comprises a first and second clamp segment as described above.

BRIEF DESCRIPTION OF THE DRAWINGS

A further understanding of the invention can be gained from the following description of the preferred embodiments when read in conjunction with the accompanying drawings in which.

DESCRIPTION OF THE PREFERRED EMBODIMENTS

Figure 1:
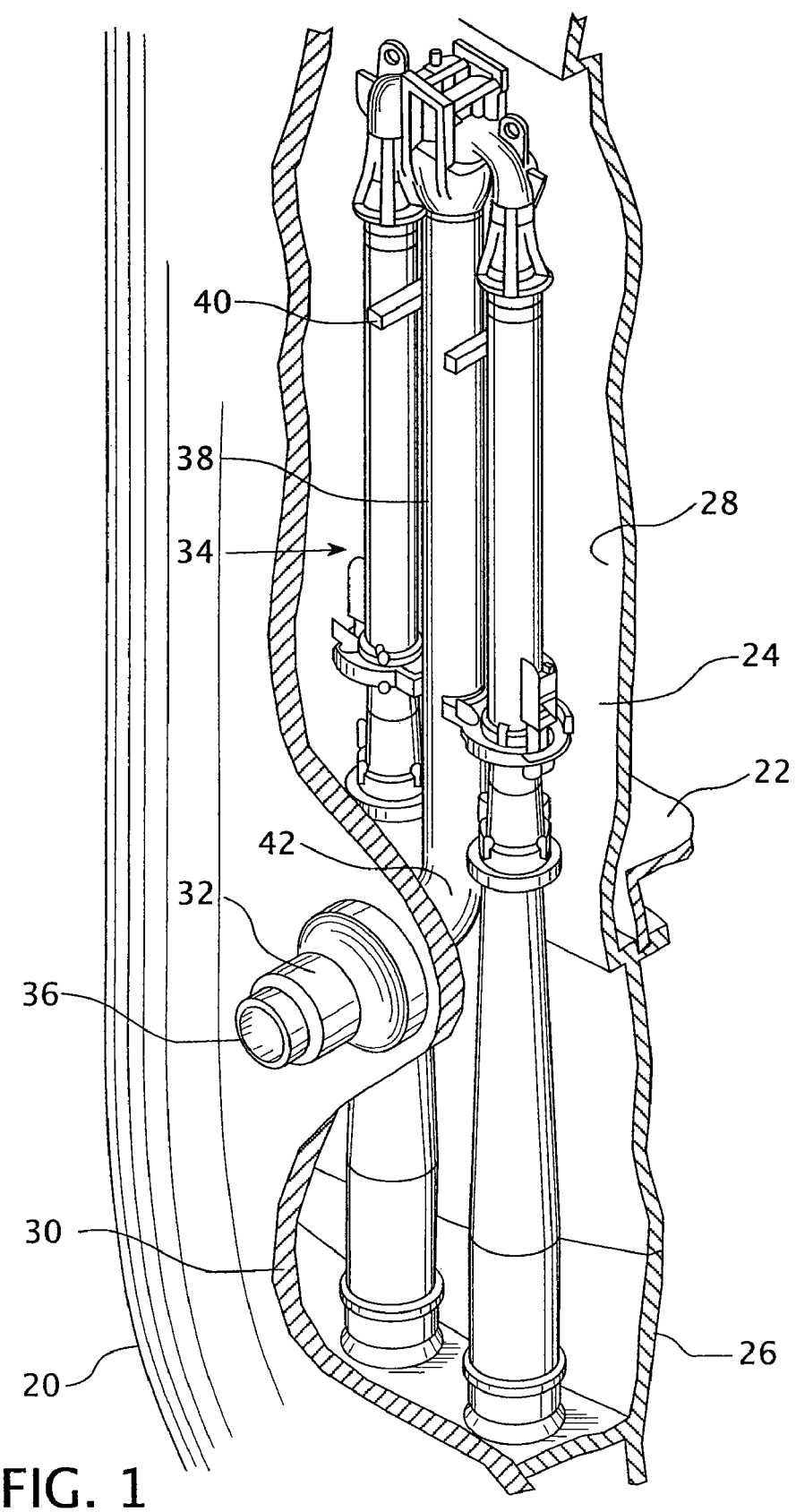
FIG. 1 is a schematic, partial cross-sectional view, with parts cut-away, of a reactor pressure vessel of a boiling water reactor.

FIG. 1 is a schematic, partial cross-sectional view, with parts cut-away, of a reactor pressure vessel 20 for a boiling water reactor. The reactor pressure vessel 20 has a generally cylindrical shape and is closed at one end by a bottom head and at its other end by a removable top head (not shown). A top guide (not shown) is spaced above a core plate 22 within the reactor pressure vessel 20. A shroud 24 surrounds core plate 22 and is supported by a shroud support structure 26. An annulus 28 is formed between the shroud 24 and the sidewall 30 of the reactor pressure vessel 20.

An inlet nozzle 32 extends through the sidewall 30 of the reactor pressure vessel 20 and is coupled to a jet pump assembly 34. The jet pump assembly 34 includes a thermal sleeve 36 which extends through the nozzle 32, a lower elbow 42 (partially visible in FIG. 1), and a riser pipe 38. The thermal sleeve 36 is secured at a first end (not shown) to a first end of the lower elbow. Particularly, the first end of the thermal sleeve 36 is welded to the first end of the lower elbow 42. A second end of the lower elbow 42 is similarly secured, or welded, to one end of the riser pipe 38. The riser pipe 38 extends between and substantially parallel to the shroud 24 and the reactor pressure vessel sidewall 30. A riser brace 40 stabilizes the riser pipe 38 within the reactor pressure vessel 20. Jet pump assemblies such as assembly 34 are well known in the art, and assembly 34 is illustrated here by way of example only. The present invention can be used with other jet pump assemblies and thermal sleeves, and is not limited to use with only assembly 34.

In addition, the present invention is not limited to an application to the boiling water reactor illustrated in FIG. 1. The present invention could be used in a number of different reactor designs having alternative configurations and many different piping configurations such as where an extension is interposed between the riser elbow 42 and the thermal sleeve 36. Furthermore, the clamp support of this invention can be used in other critical pipe connections within a nuclear facility or elsewhere.

Figure 2:
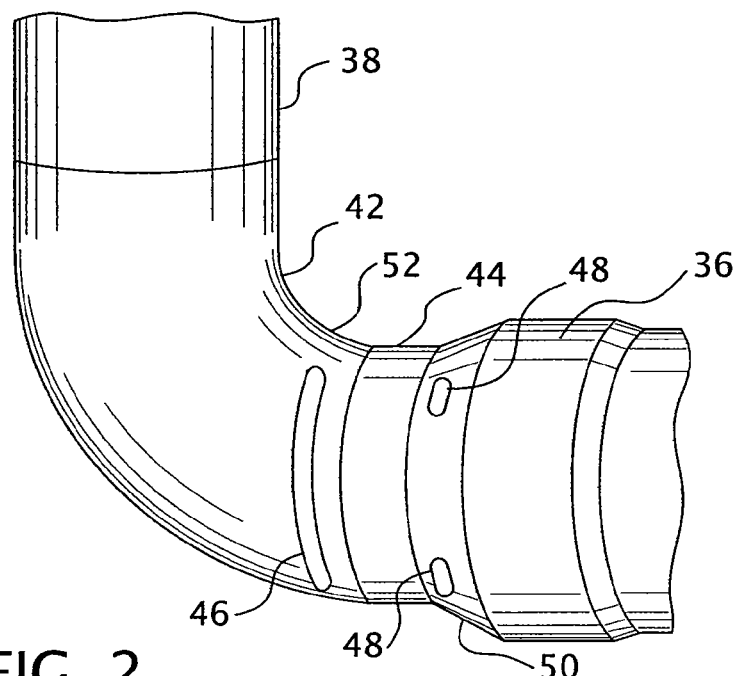
FIG. 2 is a side perspective view of a jet pump riser elbow and thermal sleeve connection with an extension therebetween and pockets machined in the thermal sleeve and a groove machined in the elbow.

FIG. 2 is a perspective view of the thermal sleeve 36 end 50 that couples to the opposing end 52 of the elbow 42. In this illustration an intermediate extension 44 is interposed between the opposing end 52 of the elbow 42 and the connecting end 50 of the thermal sleeve 36. The connections of the extension 44 to the end 50 of the thermal sleeve 36 and to the opposing end 52 of the elbow 42 is made by welding. FIG. 2 gives a better view of the elbow 42 to thermal sleeve 36 connection than can be appreciated from FIG. 1. As will be explained hereafter, in accordance with this invention pockets 48 are machined in the end 50 of the thermal sleeve 36 and grooves 46 are machined in the end 52 of the elbow. Preferably, four symmetrically spaced pockets are provided around the circumference of the end 50 of the thermal sleeve 36. Desirably, two, spaced circumferential grooves are provided around the end 52 of the elbow 42. In the preferred embodiment the grooves 46 and the pockets 48 are not through-wall and are preferably machined by an electrical-discharge machining process. However, as can better be appreciated hereafter, even if the walls of either the elbow 42 or thermal sleeve 36 are punctured in the course of the machining process, inserts on the clamp, i.e. fingers and ridges that seat in the pockets 48 and the grooves 46 when the clamp is engaged over the coupling, will control any leakage to an acceptable level.

Figure 3:
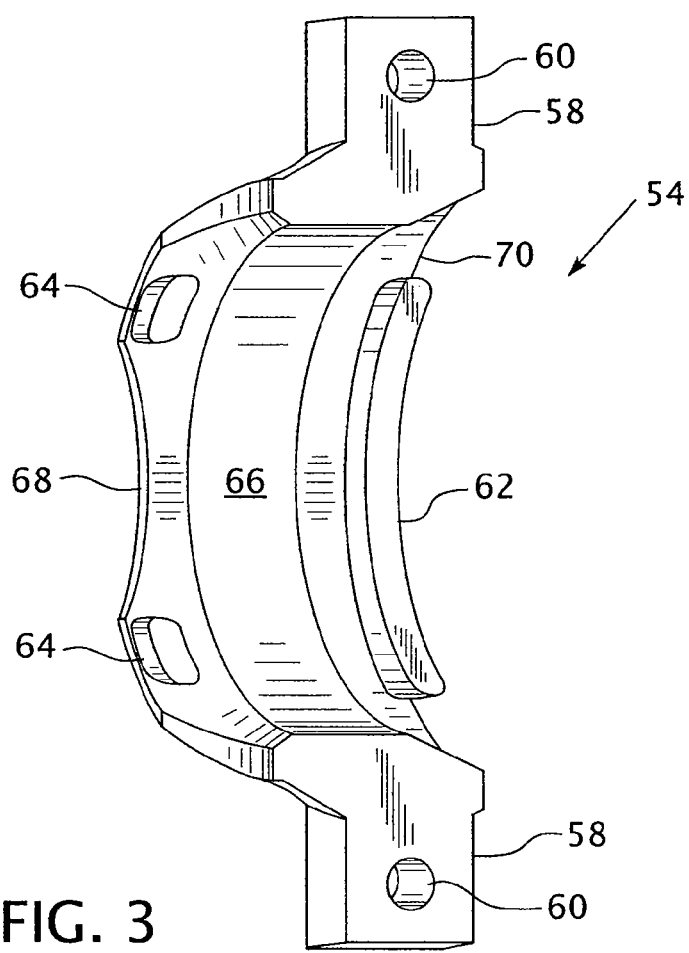
FIG. 3 is a perspective view of the underside of one clamp segment of this invention.

FIG. 3 is a perspective view showing the interior side of one segment of the clamp 54. The segment illustrated in FIG. 3 is semi-circular requiring only two segments 54 to circumscribe the connection between the elbow 42 and the thermal sleeve 36. However, it should be appreciated that any number of separate clamp segments 54 can be used, e.g., quarter sections, one-eighth sections, to circumscribe the connection between the elbow 42 and thermal sleeve 36. The clamp segment has a radially extending lip 58 at either end with a through bolt hole 60 that is employed to align with corresponding bolt holes on a mating segment of the clamp. In this embodiment fingers 64 project inwardly from one axial end of the clamp and are circumferentially spaced to align with corresponding pockets 48 in the thermal sleeve 36. Though two fingers 64 are shown it should be appreciated that the number of fingers employed will depend upon the forces the clamp segment 54 will encounter in each application. In this application to a jet pump riser elbow to thermal sleeve coupling two fingers 64 were determined to be adequate. The fingers 64 extend from the inner surface of the clamp segment 54 in a direction parallel to a force vector that draws opposing clamp segments together. Thus, in the embodiment shown in FIG. 3 the fingers 64 extend in a direction transverse to a plane that passes through the opposing faces of the lips 58 and in a direction towards the second axial end 70 of the clamp segment 54. The extended length of the fingers 64 will depend to some degree on the wall thickness of the thermal sleeve 36 and the depth of the pockets 48. Desirably, the remaining minimum wall thickness in the thermal sleeve 36 between the bottom of the pockets 48 and the inner surface of the thermal sleeve is approximately 0.25 in (0.64 cm). The extended length of the fingers 64 should be long enough to support the inner surface 66 of the clamp segment 54 at least slightly above the weld joint and preferably above the outer underlying surface of the thermal sleeve 36. In this preferred embodiment the fingers 64 have a circumferential width of about 1.83 in. (4.65 cm). The pockets 48 on the thermal sleeve end 50 have complimentary dimensions.

Similarly, a ridge 62 projects inwardly in a direction parallel to the force vector that draws the opposing clamp segments together, from the interior surface 66 of the clamp segment 54 towards the first axial end of the clamp 68. The extended length of the ridge 62 will depend to some degree on the wall thickness of the elbow 42 and the depth of the groove 46. Desirably, the remaining minimum wall thickness in the elbow 42 between the bottom of the groove 46 and the inner surface of the elbow 42 is approximately 0.06 in. (0.16 cm). The extended length of the ridge 62 should be long enough to support the inner surface 66 of the clamp segment 54 at least slightly above the weld and preferably above the outer underlying surface of the elbow 42. In this embodiment the ridge 62 extends circumferentially over an arc of approximately 120 degrees centered between the lips 58. In this embodiment the ridge 62 has an axial width of about 0.85 in. (2.16 cm) and seats in a complimentary groove 46 in the riser elbow 42 that has corresponding dimensions. Preferably the fingers 64 are tapered so that their cross-sections narrow in the extended inwardly direction and seat in complimentary tapered openings in the pockets 48. The complimentary taper forces the elbow 42 and the thermal sleeve 36 to be drawn together as the clamp segments 54 are tightened around the connection between the elbow 42 and the thermal sleeve 36. Desirably the central interior surface 66 of the clamp segment 54 is concave and the radial extension of the fingers 64 and the ridge 62 is greater than the depth respectively of the pockets 48 and the groove 46 so that the clamp interior surface sits above the elbow 42 the extension 44 and the thermal sleeve 36 except for the fingers 64 which contact the pockets 48 and the ridge 62 which contact the groove 46. In that way the welds on either side of the extension 44 do not receive a radial pressure from the clamp.

Figure 4:
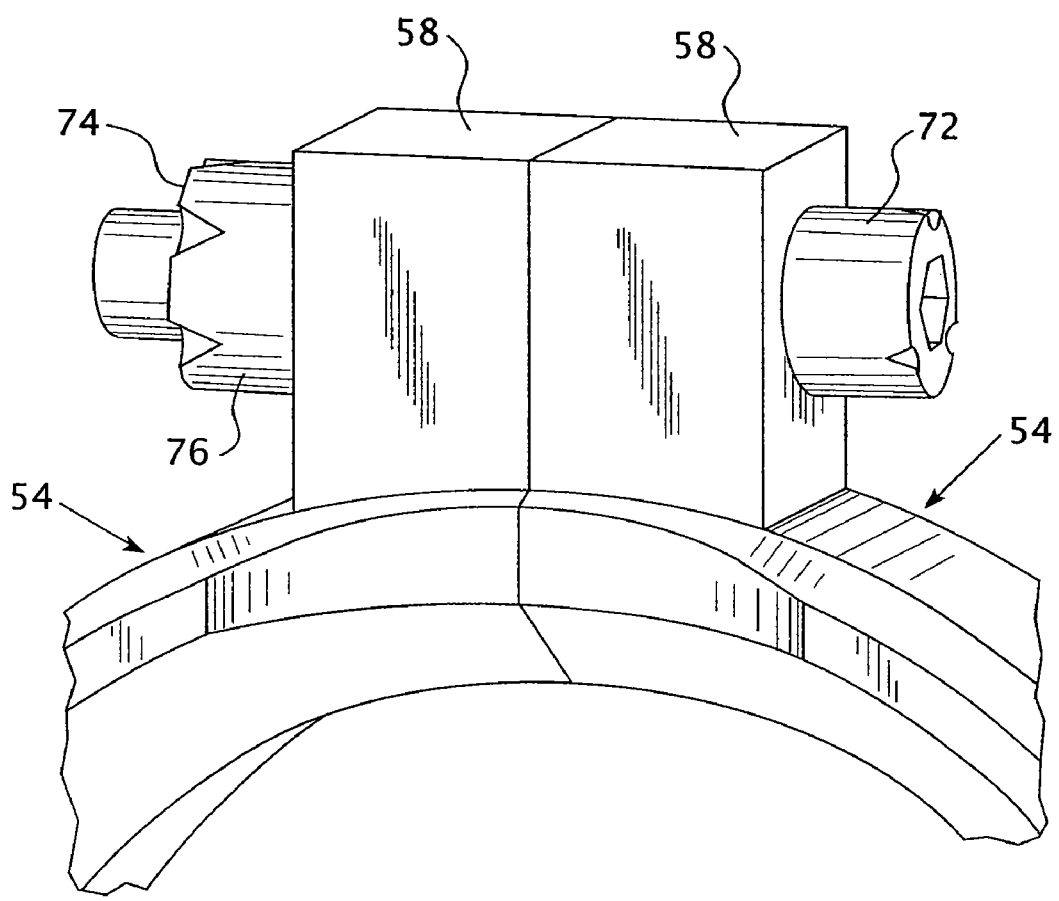
FIG. 4 is a side view partially showing the first clamp segment and the second clamp segment coupled at adjoining lips by a bolt and nut.

FIG. 4 shows a perspective view of one end of mating clamp segments 54 with the lips 58 aligned to be secured by a bolt 72 that is anchored in position by a nut 74 and fastened by locking cup 76.

Figure 5:
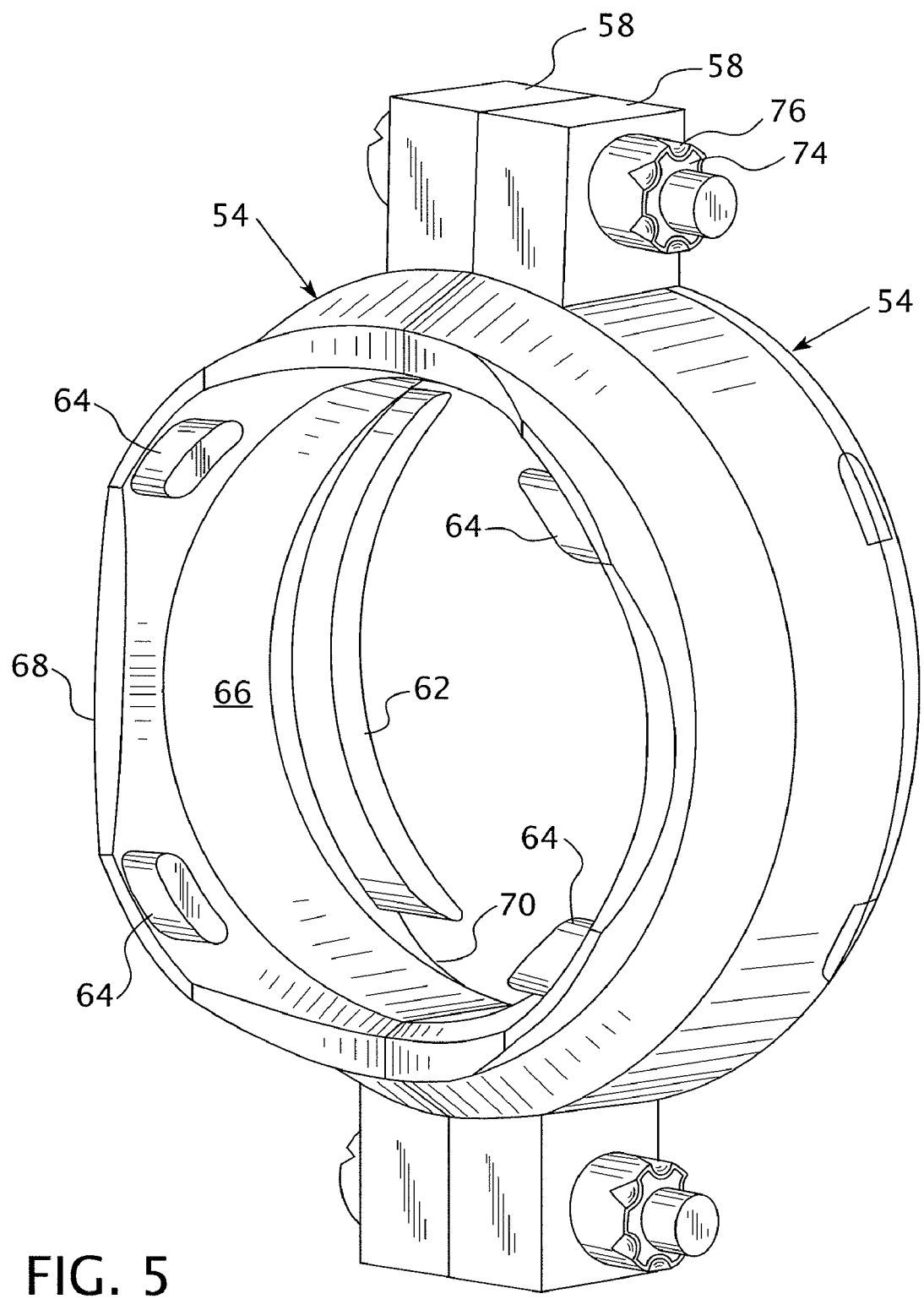
FIG. 5 is a perspective view of the clamp of this invention illustrating the positioning of the fingers and ridges.

FIG. 5 is a perspective view taken from the first axial side 68 of the clamp 54 that shows a full view of the two segments 54 of the clamp from the finger 64 side.

Figure 6:
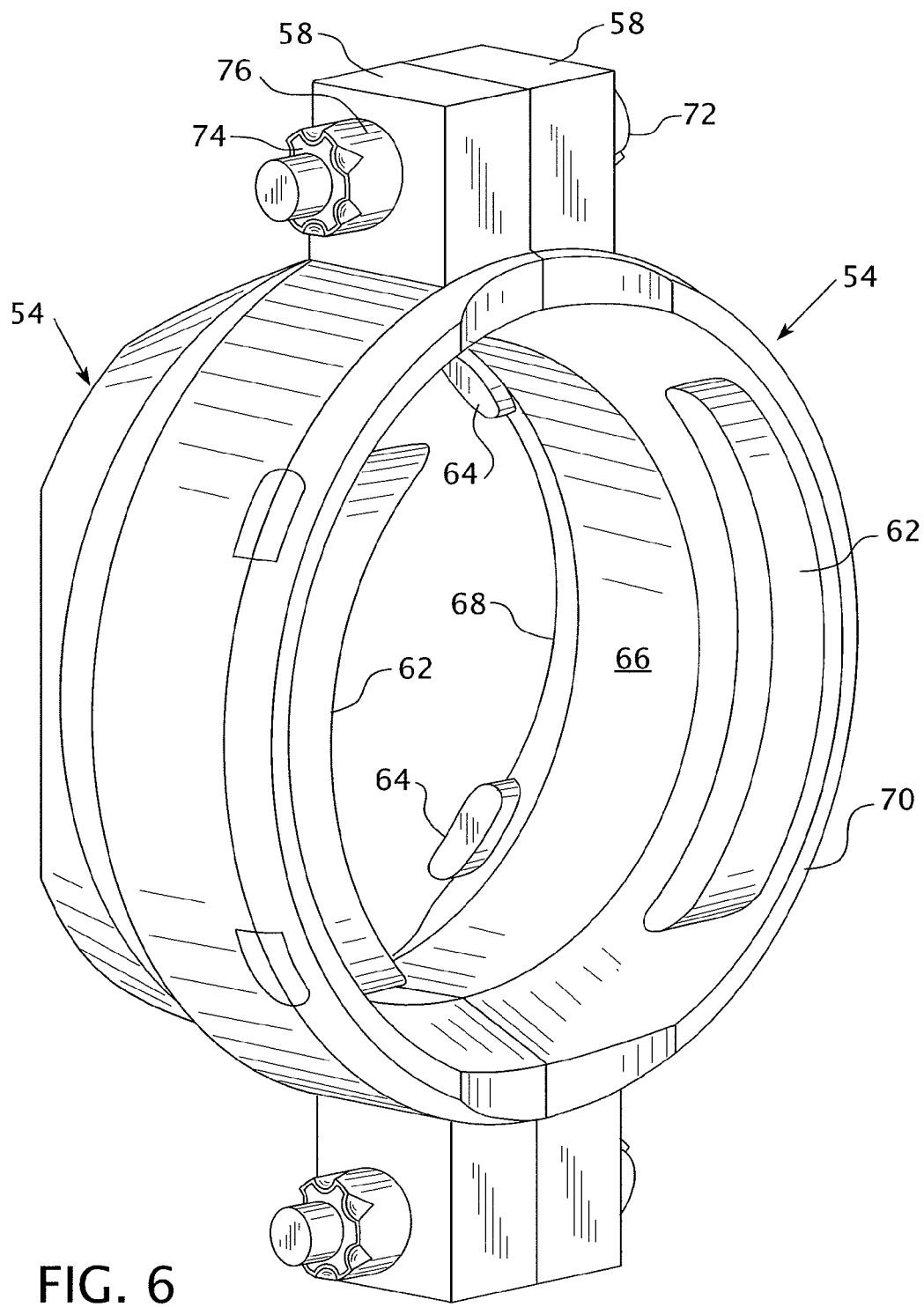
FIG. 6 is a perspective view of the clamp shown in FIG. 5 from an opposite view that shows the ridges on each clamp segment in the foreground.

FIG. 6 is a perspective view of the full clamp shown in FIG. 5 from the opposite side 70 providing a better view of the ridges 62.

Figure 7:
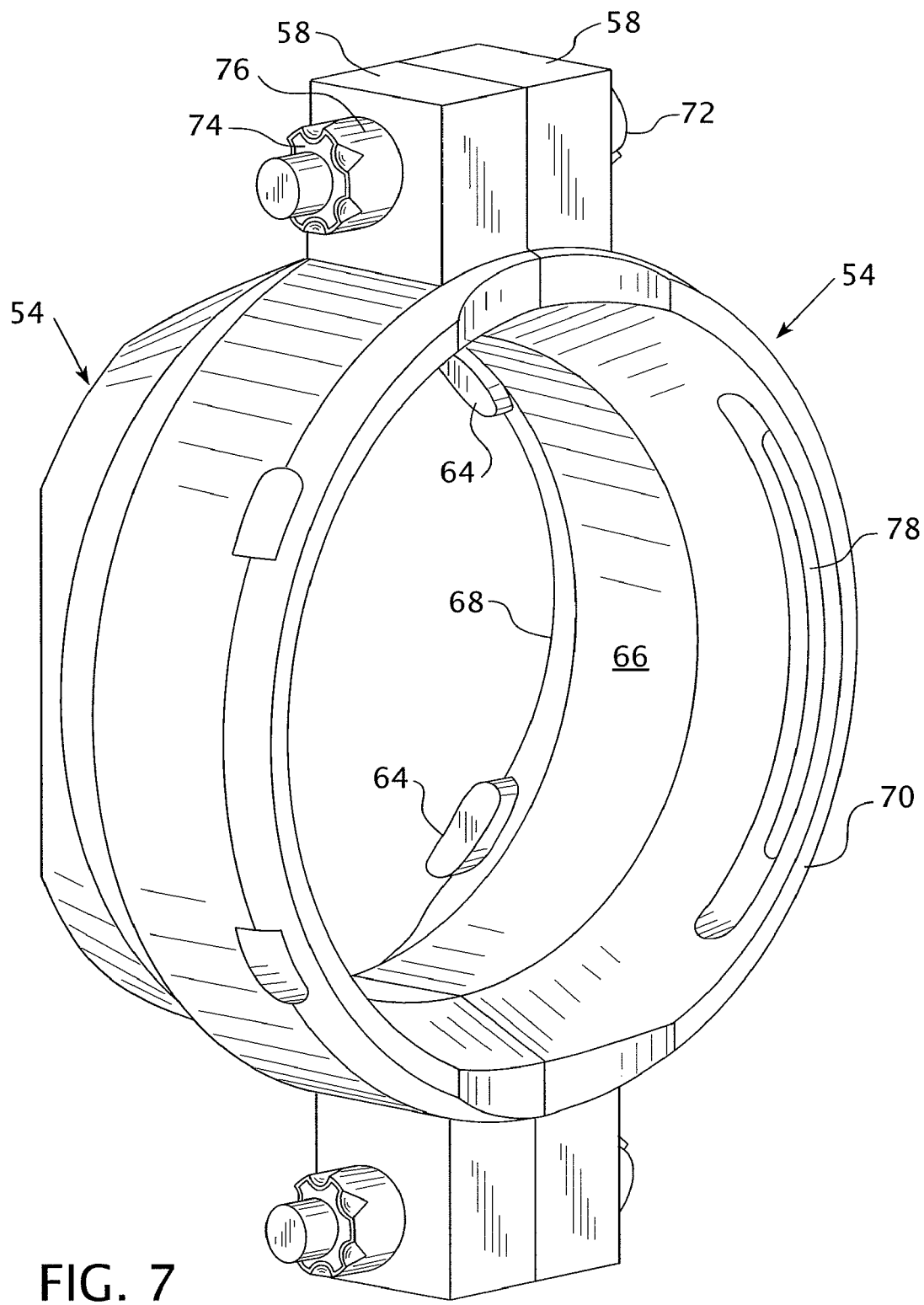
FIG. 7 is a perspective view similar to that shown in FIG. 6 illustrating the sockets or recesses in which removable ridges are seated during clamping.

FIG. 7 is a perspective view of the full clamp, showing the two segments 54 coupled together by the bolts 72 and nuts 74. FIG. 7 also shows the slot 78 in which the ridge 62 shown in FIG. 6 fits into and is held in place by an interference fit. Thus, the ridges 62 can be nondestructively removed for ease of machining or replacement. Similarly, the fingers 64 may be removable for the same purpose.

Figure 8:
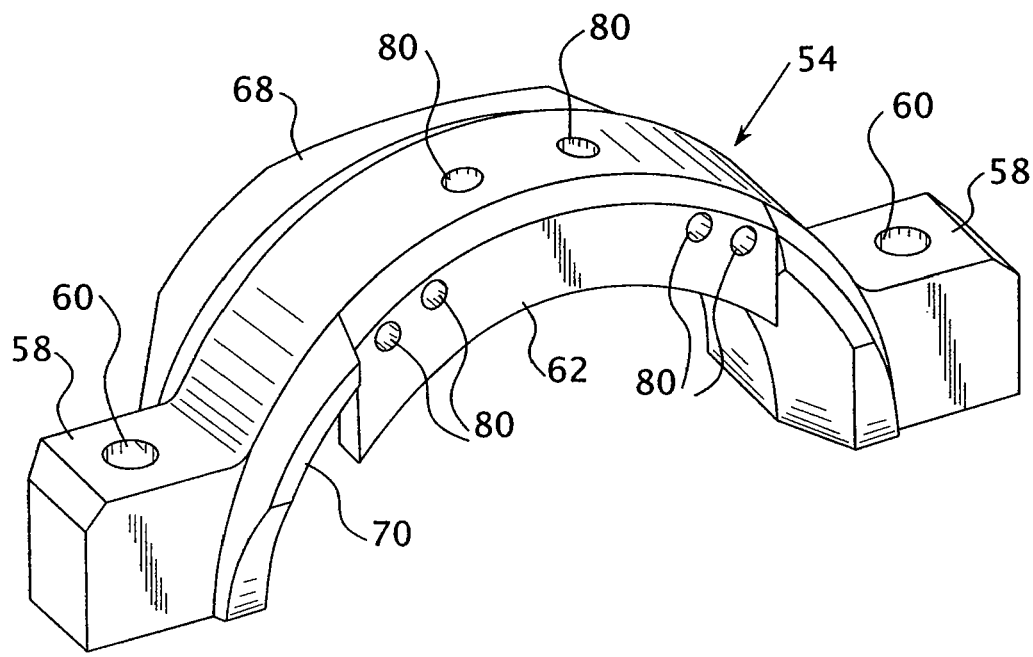
FIG. 8 is a perspective view of one clamp segment showing a removable ridge that is secured in position through the use of through bolt holes.

FIG. 8 is a perspective view showing a clamp segment 54 from the second axial side 70 with a removable ridge 62 that is held in place with bolts that secure the ridge 62 through the thru-bolt holes 80.

Figure 9:
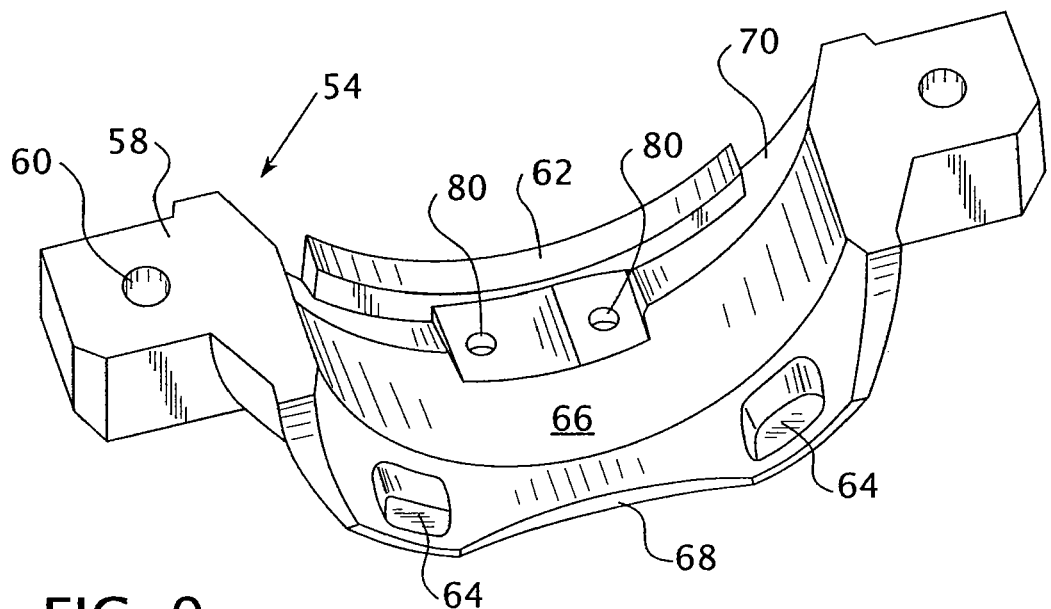
FIG. 9 is a perspective view of the underside of the clamp segment shown in FIG. 8 providing another view of the through bolt holes that secure the ridges in position.

FIG. 9 is a perspective view of the underside of the clamp with a removable ridge 62 illustrating how the removable ridge 62 is bolted to the body of the clamp both from the top side as well as the side 70 through the thru-bolt holes 80. FIG. 9 also shows slots for removable fingers 64 that can be secured in a similar manner.

Figure 10:
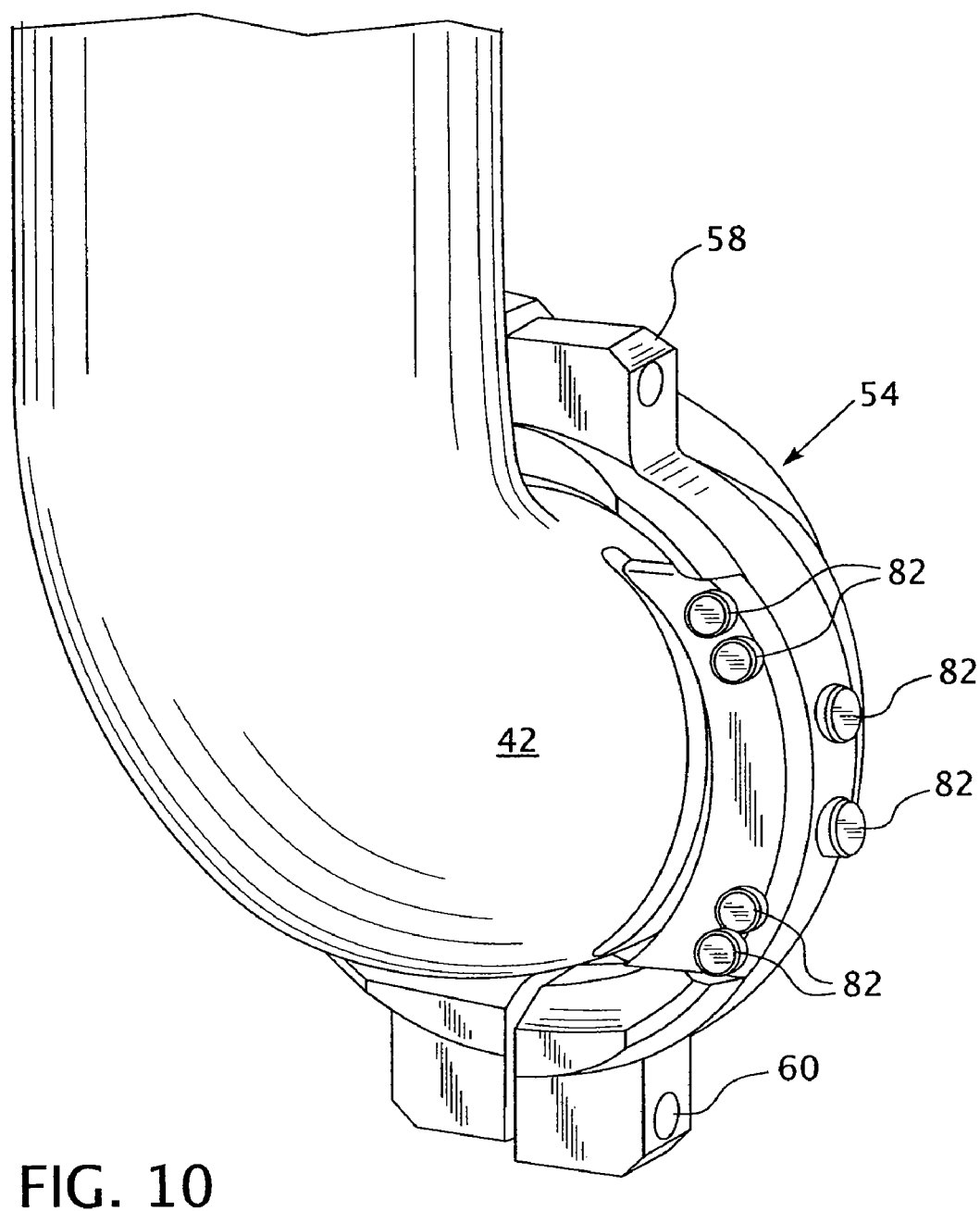
FIG. 10 is a perspective view of the clamp of this invention and shows a removable ridge secured in position on the thermal sleeve side of the clamp.

FIG. 10 is a perspective view of a clamp segment 54 positioned around the riser elbow 42 with a removable ridge 62 bolted in place by six ridge bolts 82. It should be appreciated that the number of bolts required to bolt the ridges or fingers in place may vary with the application and the force that will be experienced during operation of the system to which the clamp is applied.

In an application to a boiling water reactor jet pump riser elbow 42 and thermal sleeve 36 the grooves 46 are machined into the riser elbow 42 to complement the ridges 62 and spread the load that will be experienced by the clamp segments 54 because the walls on the riser elbow 42 are thinner than the walls on the thermal sleeve 36. Thus the grooves 46 and the ridges 62 spread the load on the elbow 42 to assure that the elbow 42 walls are not compromised. On the other hand, the thermal sleeve 36 has thicker walls which can better withstand a load imparted by the segment 54. Therefore, smaller pockets 48 than the grooves 46 are employed on the thermal sleeve 36 to reduce the amount of material that has to be removed and the machining time that is required. The axial length of the clamp is based on the nominal locations of the pockets 48 and grooves 46 adjacent to the welds and includes an allowance for a shorter or longer extension 44, if one is present, and the accessibility of the riser elbow 42 end 52. The clamp is designed to have a generous clearance with the thermal sleeve 36, extension pup 44 and riser elbow 42. The fingers 64 of the clamp are designed to fit accurately within the pockets 48 to obtain a snug fit and axial compression. Misalignment at the welds, ovality and excess weld reinforcement are expected within welding code allowances and field experience. The pockets 48 will be located for the best fit with the elbow 42, which has the thinner wall. The pockets 48 and the thermal sleeve 36 may be off center as required to fit the elbow 42. The same is true of the elbow. The clamp is designed to fit without penetrating the thermal sleeve 36 or elbow 42. In the event of an inadvertent penetration of either the thermal sleeve 36 or the elbow 42, the fit of the finger 64 in the pockets 48, and the ridges 62 in the grooves 46 will limit leakage to acceptable rates. As previously mentioned, the clamp halves are joined with two bolts 72 tensioned by torque. The bolts are retained by locking cups crimped to the head and nut 74 of the bolts 72.

As previously noted, the fingers 64 and pockets 48 have matching tapers that will develop axial preload acting to reduce the gap at the cracked weld. In addition, or alternately, the ridges 62 and the grooves 46 may have matching tapers for the same purpose.

The cold recirculation loop startup produces a 50° F. (10° C.) temperature difference with the riser piping becoming colder than the downcomer and clamp. The reduction in diameter of the thermal sleeve 36 and riser elbow 42 relative to the clamp is 0.005" (0.127 mm). The engagement of the fingers 64 in the pockets 48 is significantly greater such that the clamp will not disengage. This transient has a short duration and should not result in significant leakage. The weight of the clamp is approximately 125 pounds (46.66 kg) and the effect of the clamp mass on the recirculation nozzle has been calculated to be acceptable.

While specific embodiments of the invention have been described in detail, it will be appreciated by those skilled in the art that various modifications and alternatives to those details could be developed in light of the overall teachings of the disclosure. Accordingly, the particular embodiments disclosed are meant to be illustrative only and not limiting as to the scope of the invention, which is to be given the full breadth of the appended claims and any and all equivalence thereof.

What is claimed is:

1. A piping assembly comprising:
   first and second pipes having radial and axial dimensions, the first and second pipes having respective opposing ends and a circumferential dimension which respectively extends around the first and second opposing pipe ends;
   a clamp for coupling a joint between the first and the second pipe ends when the pipe ends are in opposing relation,
   the clamp comprising:
   a first clamp segment having a radial inner surface with first and second axial ends that substantially match the curvature of the circumference of a first segment of the first and second pipes to which the first clamp segment will be attached, the first clamp segment having a first ridge adjacent the first axial end of the first clamp segment, the first ridge extending inwardly from and circumferentially along the first clamp segment inner radial surface to mate with a corresponding complementary circumferential groove preformed in the first pipe adjacent the first pipe end, the first clamp segment having a first finger adjacent the second axial end of the first clamp segment, the first finger extending inwardly from and circumferentially along the first clamp segment inner radial surface second end to mate with a corresponding complementary pocket preformed in the second pipe adjacent the second pipe end, the first ridge extending circumferentially along the inner radial surface first end of the first clamp segment substantially further than the first finger extends circumferentially along the inner radial surface second end of the first clamp segment;
   a second clamp segment having a radial inner surface with first and second axial ends that substantially match the curvature of the circumference of a second segment of the first and second pipes to which the second clamp segment will be attached, the second clamp segment having a second ridge adjacent the first axial end of the second clamp segment, the second ridge extending inwardly from and circumferentially along the second clamp segment inner radial surface to mate with a corresponding complementary circumferential groove preformed in the first pipe adjacent the first pipe end, the second clamp segment having a second finger adjacent the second axial end of the first clamp segment, the second finger extending inwardly from and circumferentially along the second clamp segment inner radial surface second end to mate with a corresponding complementary pocket preformed in the second pipe adjacent the second pipe end, the second ridge extending circumferentially along the inner radial surface first end of the second clamp segment substantially further than the second finger extends circumferentially along the inner radial surface second end of the second clamp segment; and
   means for tightly connecting the first clamp segment to the second clamp segment around the first and second pipes when the first clamp segment and the second clamp segment span the joint.

2. The piping assembly of claim 1 wherein at least a central axial portion of the inner radial surface of the first clamp segment and the second clamp segment is concave in the axial direction.

3. The piping assembly of claim 2 wherein a recess formed by the central axial portion of the inner radial surface is sufficiently deep to maintain the inner surface spaced from a weld connecting the joint between the first and second opposing pipe ends.

4. The piping assembly of claim 1 wherein the means for tightly connecting the first clamp segment to the second clamp segment are radial outwardly extending lips at both circumferential ends of the first clamp segment and the second clamp segment, wherein one the lips on the first clamp segment is joined to one of the lips on the second clamp segment and the other of the lips on the first clamp segment is joined to the other of the lips on the second clamp segment.

5. The piping assembly of claim 4 wherein the corresponding lips on the first clamp segment and the second clamp segment are joined by bolts.

6. The piping assembly of claim 1 wherein either the ridges or fingers or both are tapered with a cross-section narrowing in the radial inwardly direction.

7. The piping assembly of claim 6 wherein the taper on either the ridges or fingers or both are sized to match a corresponding taper on the grooves and pockets.

8. The piping assembly of claim 6 wherein the tapers on the ridges or fingers or both draw the first and the second pipe ends toward each other as the connecting means is tightened when the clamp is installed over the joint.

9. The piping assembly of claim 1 wherein a radially extended dimension of the ridges extending from the inner surface of the first clamp segment and the second clamp segment is greater than a depth of the grooves and a radially extended dimension of the fingers extending from the inner surface of the first clamp segment and the second clamp segment is greater than a depth of the pockets so that the inner surface is spaced from an outer wall of the first pipe mad the second pipe when the clamp is clamped in position.

10. The piping assembly of claim 1 wherein at least some of either or both of the ridges and the fingers are nondestructively, removeably seated within a recess in the radial inner surface of the first clamp segment and the second clamp segment.

11. The piping assembly of claim 10 wherein either the ridges or the fingers are seated in the recess in the radial inner surface by a mechanical connection.

12. The piping assembly of claim 11 wherein the mechanical connection is an interference fit.

13. The piping assembly of claim 11 wherein the mechanical connection is a bolted connection.

14. The piping assembly of claim 1 wherein the first clamp segment and the second clamp segment respectively, substantially span 180 degrees of the circumference of the first and second pipes to which the clamp is designed to be applied.

15. The piping assembly of claim 1 wherein the first finger on the first clamp segment comprises a plurality of circumferentially spaced fingers adjacent the second axial end.

16. The piping assembly of claim 15 wherein the first clamp segment has twice as many fingers as it has ridges.

17. The piping assembly of claim 1 wherein the first ridge, the first finger, the second ridge and the second finger each extend inwardly in a direction substantially parallel to a force vector that draws the first clamp segment together with the second clamp segment, and would draw the first and second pipe ends together when the clamp is installed over the joint.

* * * * *